3,634,352
SYNTHETIC RUBBER COMPOSITIONS TACKIFIED
BY MODIFIED PINE GUM
William J. Mueller, Worthington, and David A. Berry, Columbus, Ohio, and Noah J. Halbrook, Walter H. Schuller, and Ray V. Lawrence, Lake City, Fla., assignors to the United States of America as represented by the Secretary of Agriculture
No Drawing. Filed Aug. 29, 1969, Ser. No. 854,297
Int. Cl. C08d 9/12
U.S. Cl. 260—27 BB
9 Claims

ABSTRACT OF THE DISCLOSURE

SBR, nitrile, and EPDM synthetic rubber compositions of enhanced building tack from a content therein of from ½ to 15 phr. of modified pine gum which is the reaction product of maleic acid, fumaric acid, maleic anhydride, or a mixture thereof with pine oleoresin in an inert atmosphere.

---

A nonexclusive, irrevocable, royalty-free license in the invention herein described throughout the world for all purposes of the United States Government, with the power to grant sublicenses for such purposes, is hereby granted to the Government of the United States of America.

This invention relates to synthetic rubber compositions of enhanced building tack from a content therein of particularly modified pine gum. More particularly, the invention concerns SBR, nitrile, and EPDM synthetic rubber compositions containing from ½ to 15 phr. (based on the rubber content) of a pine gum which has been modified by reaction thereof with maleic acid, fumaric acid, maleic anhydride, or a mixture thereof.

In its usual meaning, pine gum is considered to be the natural oleoresin of pine trees (Pinus spp.) obtained by tapping, scarring, or chipping of living trunks of pine trees and collection of the exudate therefrom. Generally for commercial purposes, two important products—turpentine and rosin (colophony)—are separated, as by distillation means, from natural pine oleoresin and then marketed. In the United States most of the commercially available natural pine gums are from longleaf pine (*Pinus palustris*) and the slash pine (*Pinus caribaea*). Of course other North American pines, as well as pines native to other regions of the world, are known to provide pine gum. Depending on the particular species of pine, its particular environment or climatic growing conditions, the like factors, the composition of natural pine gum will vary somewhat. As a general rule though, material pine gum consists essentially of rosin and at least 20 percent by weight of turpentine. Pine gums of much higher turpentine content, such as the present-day commercial washed pine gum of about 35 percent turpentine content, are prepared by diluting pine gum with additional turpentine. Most of the chemical constituents of natural pine oleoresin have been identified, as illustrated by Joye, Jr., et al. in "J. Org. Chem." 31 (1), January 1966, wherein on page 321 is reported the composition of resin acid fraction of a typical sample of slash pine oleoresin. Typical and illustrative characteristics of pine oleoresin are a content of about 20 to 35 percent of levopimaric acid, a total resin acids content of about 80 percent, and an acid number of between 125 to 145.

For purposes of the present invention, the term "pine gum" is intended to include both the natural oleoresin of pine treees and also a synthetic or fabricated substantial duplicate thereof, which is readily preparable merely by blending gum, wood, or tall oil rosin and turpentine together in proportions found in pine oleoresin. Generally the useful pine gum which is subsequently modified for purposes of the invention, is relatively clean, as by being substantially free from bark, twigs, needles, dirt, and like refuse, which are filterable from collected natural pine oleoresin. This useful pine gum contains at least about 25 percent by weight of turpentine, and a balance essentially of rosin (i.e., various resin acids) except for possibly up to a few percent total of other constituents. It may contain up to about 40 percent of turpentine and preferably contains between 25 and 40 percent turpentine.

Of particular concern to the invention are synthetic rubber compositions wherein the employed synthetic rubber is any of a styrene-butadiene rubber, a nitrile rubber, and an EPDM rubber. More particularly styrene-butadiene rubber (also frequently designated SBR rubber) is an elastomeric copolymer resulting from emulsion copolymerization of butadiene and styrene in varying ratios, most commonly in a ratio of 70 to 80 parts of butadiene to 30 to 20 parts of styrene, with both cold (i.e., polymerized at about 40° F.) and hot (i.e., polymerized at 122° F.) type SBR rubbers commercially available. More particularly, nitrile rubber is an elastomeric copolymer of acrylonitrile and a diene, with commercially available nitrile rubbers being of acrylonitrile/butadiene copolymerization and most commonly of 18 to 48 percent and preferably 26 to 40 percent acrylonitrile. More particularly, EPDM rubber (frequently also termed ethylenepropylene terpolymer rubber) is an elastomeric terpolymer produced by polymerization of ethylene, propylene, and a small amount of a third monomer which is a diene.

Typically employed dienes are straight chain conjugated dienes, such as: 1,3-butadiene; and isoprene; and nonconjugated dienes, such as: dicyclopentadiene; 2-methylenenorbornene; 11-ethyl-1,11-tridecadiene; and $2^1$-ethyl-$2^1$-butanyl)norbornene. Typical EPDM rubbers are, for example, from about 40 to 60 mole percent ethylene and 60 to 40 mole percent propylene with anywhere between 0.1 to 1.0 mole of the diene third monomer per kilogram of ethylene-propylene copolymer. Moleculrar weight of EPDM rubber can range from 100,000 to 1,000,000 with the average molecular weight generally falling within the range of about 250,000 to 400,000.

As is kell known in the synthetic rubber art, each of these synthetic rubbers of concern are compounded or blended with various other constituents and then subsequently vulcanized or cured to provide useful end products. For example, SBR rubber may be compounded with sulfur or other curing agents, activators such as zinc stearate through addition of zinc oxide and stearic acid, accelerators, retarders, antioxidants and antiozanants, fillers such as carbon blacks, softeners and and plasticizers, extenders, and the like, additives. For example, nitrile rubber may be compounded with curing agents such as sulfur, dicumyl peroxide and the like, accelerators, antioxidants and antiozonants, retarders, plasticizers, fillers such as carbon blacks and mineral fillers, and like additives. For example, EPDM rubber may be compounded with cross-linking systems employeing such well known acceleration types as carbamates, thiazoles, aldehydeamines, sulfinamides, thiuram sulfides, as well as sulfur, various peroxides including benzoyl peroxide, di-tertiary butyl peroxide, dicumyl peroxide, and the like, fillers such as carbon blacks, pigments such as any of numerous metal oxides, plasticizers, and the like additives. Also equally well known in the synthetic rubber art are processes, procedures, techniques, apparatus and the like for preparing those curable synthetic rubber compositions which subsequently are cured or vulcanized.

In producing various useful rubber products, such as automotive tires, belts, and the like, from synthetic rubber compositions it is necessary to assemble uncured component parts before curing the composition into a unitary product. To facilitate product preparation, it is necessary that assembled uncured parts firmly adhere together through handling operations until the assembly be placed in a mold and cured. The ability of uncured rubber to adhere to another piece of uncured rubber is called building tack. Tackifiers, i.e., materials added to rubber to impart and/or to increase building tack, often must be included to provide adequate building tack in various synthetic rubber compositions so that such useful rubber products may be produced.

So far as is known, pine gum per se is not used commercially in rubber compositions. On the other hand, rosin per se and a number of chemically modified rosins are taught as useful additives for rubber compositions. However, only a few of the many known modified-rosin materials even have been found to be useful tacifiers for synthetic rubbers with most modified-rosin materials imparting little to no building tack or otherwise of no utility as tackifiers because of various disadvantages. In the past, rosin per se, a few rosin esters, and only a few other rosin derivatives have been taught as useful tackifiers for some rubbers. Note, for example, "Rubber Age," Volume 100, No. 6, June 1968, pages 59–64. Even though several modified-rosin tackifiers are known as useful, there still continues to be a need for alternative and/or new and improved tackifiers, as those presently known and used are not completely free of disadvantages. For example, cost thereof and amount of tackifier to impart substantial building tack greatly effect commercial value. Thus, it is to fulfilling such needs of the prior art that the present invention is directed, with the tackified synthetic rubber-base compositions of the invention being of utility for preparation of those above-described useful rubber products.

The present invention provides new and useful synthetic rubber compositions of enhanced building tack. These synthetic rubber compositions may contain any of styrene-butadiene rubber, nitrile rubber, and ethylene-propylene terpolymer rubber and for each 100 parts by weight of the rubber therein exhibit enhanced building tack from containing therein from ½ to 15 parts by weight of particularly modified pine gum. While amounts as low as ½ phr. (based on the synthetic rubber) and as high as 15 phr. provide enhancement of building tack amounts, amounts between 2 and 11 phr. generally are preferred. Economic considerations indicate that about 15 phr. is a practical upper limit on the amount of the modified pine gum to be employed in the rubber compositions.

The particular modified pine gum employed as tackifiers in the synthetic rubber compositions of the invention is the reaction product of pine gum with maleic acid, fumaric acid, maleic anhydride, or a mixture thereof. Generally before incorporation in the rubber compositions, unreacted terpenes are removed from this reaction product, as by steam sparging. In general, this reaction product is prepared from pine gum (e.g., pine oleoresin) which preferably at least has been cleaned initially to remove dirt, twigs, bark, and like contaminating material therefrom, but which still contains its initial rosin acid content and at least 25 percent by weight of turpentine along with any other terpenes, and the like, initially present in the crude pine gum. This cleaned pine gum, or alternatively a fabricated pine gum, is placed in an apparatus providing for heating of the pine gum and maintaining of an inert gas blanket over the heated gum. The apparatus also is provided with a condensing means and trap so that distilling volatiles may be returned to the reaction vessel. After passage of a sweep of nitrogen, carbon dioxide, or the like inert gas, over the charged pine gum, the inert gas flow is reduced so as only to maintain a blanket of inert gas over the pine gum charge. The pine gum then is heated to between about 140°–150° C. and while at this temperature there is added thereto an $\alpha,\beta$-unsaturated diacid (i.e., fumaric acid, maleic acid, or maleic anhydride) periodically in incremental amounts, or at a slow rate, so as to avoid excessive frothing and to keep the temperature from exceeding about 200° C., and desirably with the temperature held between 180°–200° C. About a total of from 250 to 450, usually about 350, grams of the diacid are added for each 1000 grams of the pine gum. Whereupon, while still under its blanket of inert gas, the charge is cooked for from 3 to 5 housr. During this period, turpentine which distills out is returned back to the reaction mixture. Thereupon, the inert gas blanket is discontinued, and generally the reaction mixture is steam sparged at a temperature between 150° C. to 180° C. for at least one-half hour to remove and recover unreacted terpenes, usually isomerized terpenes. Recovered unreacted terpenes provide a by-product of commercial value. The remainder of the reactant mixture, or bottoms, is a reaction product useful for employment as the tackifier additive in the compositions of the invention. Alternatively, where the reaction has been carried forth to such an extent that the modified pine gum contains less than about 10 percent by weight thereof of unreacted terpenes, the removal of unreacted terpenes is not necessary. If the employed pine gum initially has not been filtered to remove bark and like contaminants, it desirably now is screened while hot to remove such contaminants. The reaction product obtained is a resinous mass, which may be cooled and stored in a closed container until ready for incorporation in the synthetic rubber composition. Illustrative property data of a fumaric-acid-modified pine gum follows:

USDA rosin color grade N;
Ring and ball softening point 112° C.;
Acid number in acetone 288; and
Acid number in alcohol 275.

In preparation of the particularly modified pine gum, the amount of unsaturated diacid reactant to employ is determined by the desired properties of the final product as a tackifier and should be at least 250 grams and most desirably fall within the range of 250 grams and 450 grams for each 1000 grams of employed pine gum. The pine gum and unsaturated diacid are reacted at a temperature of at least 190° C. and most desirably 200° C., and preferably between 190° and 250° C. for at least 3½ hours, and most desirably for between 3 and 5 hours. Higher reaction temperatures and longer reaction times are unnecessary, but may be used. While steam sparging has already been mentioned as a ready means to remove unreacted terpenes and the like from the reaction mixture, other means also may be employed. For example, distillation techniques, temperatures, and the like, conventionally employed for separating turpentine from crude pine gum also are useful. Desirably during removal of unreacted terpenes, the modified pine gum is not subjected to temperatures in excess of 190° C. and for times sufficient to cause degradation of the prepared modified pine gum. It is not necessary to remove all unreacted terpenes from the reactant mixture, although for economic purposes it generally is desirable. Thus the modified pine gum as employed in the compositions of the invention may be accompanied by up to about 10 percent by weight thereof of unreacted terpenes, primary turpentine.

Illustrative examples of preparations of several modified pine gums useful in compositions of the invention follow:

EXAMPLE I

A commercially cleaned pine gum containing 35 percent turpentine is used. The gum is modified with 35 parts of maleic anhydride per 100 parts gum.

An 1,800 g. sample of the gum is weighed into a 5-liter, 3-necked flask. The flask is equipped with a stirrer, dropping funnel, nitrogen inlet, thermometer, short air cooled condenser, and water trap topped with a water cooled condenser. Heat is applied and the gum heated under a nitrogen blanket with stirring to 140°–150° C. Heating of the flask is stopped and the 630 g. of maleic anhydride is added at a rate to keep the temperature between 180° and 200° C. (The reaction is exothermic. The maleic anhydride is best added molten in about 95 percent in acetone.) Addition requires about 0.5 hour. Heat is applied and the temperatures raised to 200° C. and held there for four hours. Turpentine which distills out initially is added back to the flask so as to keep a slow reflux in the flask.

The pot temperature is then dropped to 170°–165° C. and the resin steam-sparged to remove isomerized unreacted terpenes, yield of terpenes 152 g. The resin has an acid number acetone 350, softening point, ball and ring 86° C., USDA rosin color grade I.

| Materials balance: | Grams |
|---|---|
| Gum | 1800 |
| Maleic anhydride | 630 |
| Total | 2430 |
| Terpenes out | 152 |
| Found after reaction | 2,245 |
| Loss unaccounted for | 33 |

EXAMPLE II

A commercially cleaned pine gum containing 35 percent turpentine is used. The gum is modified with 35 parts of fumaric acid per 100 parts gum.

An 1,800 g. sample of the gum is weighed into a 5-liter, 3-necked flask. The flask is equipped with a stirrer, dropping funnel, nitrogen inlet, thermometer, short air cooled condenser, and water trap topped with a water cooled condenser. Heat is applied and the gum heated under a nitrogen blanked with a stirring to 145° C. After traces of water are removed 630 g. of fumaric acid is added in small increments over a 30 minute interval so as to prevent excessive froth. The temperature is raised to 200° C. during 1 hour and held there for 4 hours. Initially about 200 ml. of turpentine are distilled out. This is collected and added back to the pot as rapidly as possible while keeping a low reflux. During the condensation some water (about 30 ml.) is collected in the trap.

The temperature is then dropped to 170°–165° C. and the resin is steam sparged to remove unreacted isomerized turpentine; yield of isomerized turpentine 98.0 g. The resin had acid number in acetone 288, acid number alcohol 275, softening point by ball and ring 112° C., and USDA rosin color grade N.

| Materials balance: | Grams |
|---|---|
| Gum | 1800 |
| Fumaric acid | 630 |
|  | 2430 |
| Found: after reaction | 2292 |
| Isomerized terpenes out | 98 |
| Loss: mostly due to water formed | 40 |

EXAMPLE III

Example I is repeated except that a "synthetic pine gum" is used in place of the oleoresin. This synthetic pine gum is prepared by dissolving 650 parts of gum rosin in 350 parts of gum turpentine. The properties of the final maleated product are: acid number 330; ball and ring softening point 90° C., USDA rosin color grade K.

EXAMPLE IV

Example II is repeated except that a "synthetic pine gum" is used in place of the oleoresin. This synthetic pine gum is prepared by dissolving 650 parts of tall oil rosin in 350 parts of alpha-pinene. The properties of the final product, modified with fumaric acid are as follows: acid number 350; ball and ring softening point 65° C.; USDA rosin color grade H.

EXAMPLE V

Example I is repeated except that a "synthetic pine gum" is used in place of the oleoresin. This synthetic pine gum is prepared by dissolving 650 parts of wood rosin in 350 parts of sulfate turpentine. The properties of the final maleated rosin are: acid number 325; ball and ring softening point 85° C.; USDA rosin color grade K.

The following synthetic rubber receipes are employed in examples which follow to illustrate compositions of the invention:

RECIPE A

| Ingredients: | Parts by weight |
|---|---|
| SBR—1006 | 100 |
| EPC carbon black | 40 |
| Zinc oxide | 5 |
| Stearic acid | 1.5 |
| Tackifier | (¹) |

¹ As specified in examples.

RECIPE B

| Ingredients: | Parts by weight |
|---|---|
| Hycar 1042 | 100 |
| FEF carbon black | 50 |
| Zinc oxide | 5 |
| Stearic acid | 1 |
| Tackifier | (¹) |

¹ As specified in examples.

RECIPE C

| Ingredients: | Parts by weight |
|---|---|
| Nordel 1070 | 100 |
| FEF carbon black | 60 |
| Flexon 580 | 20 |
| Zinc oxide | 5 |
| Stearic acid | 1 |
| Tackifier | (¹) |

¹ As specified in examples.

In preparing compositions of Recipes A, B, and C, the synthetic rubber is milled on a 6 x 12-inch laboratory mill until it forms a smooth sheet. The remainder of the recipe's components then are added and milled therein. In this manner there are prepared a control composition containing no tackifier and, for comparison purposes, compositions containing 1 and 2.5 phr. (based on the synthetic rubber), respectively, of a commercial unmodified pine gum. Compositions also are prepared containing 2.5, 5, and 10 phr., respectively, of the modified pine gum of Example I, and 1, 2.5, and 5 phr. of the modified pine gum of Example II.

Samples for tack-strength measurement of each of these compositions are molded in a brass-cylindrical mold, 2 inches long, having a ⅜-inch ID polytetrafluoroethylene (Teflon) bushing lining the cylinder. Brass caps are used at each end of the mold to apply pressure. The rubber composition to be molded for tack-strength measurement is cut into two pieces about one-inch long and slightly less than ⅜-inch diameter and with a Teflon disk therebetween are inserted in the mold. This then is molded for 5 minutes at 230° F. and 1000 p.s.i. The resulting formed pieces are about 1-inch long and ⅜-inch diameter with a smooth face on each that had been in contact with the Teflon disk.

All tack measurements are made on an Instron tester using a special jig described by Forbes and McLeod (Trans. IRI, 34, 154 (1958)), except for being modified so that test samples are held in place by two small drill-press chucks. It is possible through this arrangement to control the amount of contact pressure on the samples, the contact time, and the rate of pulling the samples apart. In tack measurements reported herein, the samples were held together under a contact pressure of 10 p.s.i., and pulled apart at a rate of 10 in./min. In making these tack measurements, a piece of friction tape is wrapped around the end of the aforedescribed molded samples opposite its smooth face to distribute load thereon when clamped by the drill press jaws used with the Instron tester. To make a tack measurement, friction-taped ends of two of the aforedescribed molded specimens are placed in and clamped in the chucks, respectively. The smooth ends of the samples then are brought into mating contact under a pressure of 10 p.s.i. and held together at that pressure for the desired length of contact time. At the end of this contact time, the crosshead is pulled apart at a speed of 10 in./min. and the force required to pull the samples apart is recorded on chart paper. This recorded force measurement then is converted to tack strength (p.s.i.).

The following Tables 1, 2, and 3 present illustrative and exemplary tack measurement data for the aforedescribed synthetic rubber recipes A, B, and C containing no tackifier, containing pine gum, and containing the modified pine gums of Examples I and II.

modified pine gum is very effective at the longer contact times, although exhibiting little to no effect on the short contact times. In contrast in the styrene-butadiene synthetic rubber compositions, the Example I modified pine gum at its 5 phr. concentration is more effective at the long contact times than when employed at the other reported higher and lower concentrations. In summary, the modified pine gums are most effective in nitrile synthetic rubber compositions with nitrile synthetic rubber compositions being preferred compositions, although the modified pine gums also function well as tackifiers in other synthetic rubber compositions.

It should be noted depending on the particularly employed modified pine gum, the specific synthetic rubber and its particular recipe, as well as the amount of employed modified pine gum, and the like, that the same amount of building tack is not necessarily exhibited by TABLE 1.—EFFECT OF TACKIFIER CONCENTRATION IN SBR COMPOSITIONS (Recipe A)

| | | | | | Tack strength, p.s.i. | | | | |
|---|---|---|---|---|---|---|---|---|---|
| Tackifier | None | Maleic modified pine gum (Ex. 1) | | | Fumaric modified pine gum (Ex. 2) | | | Commercial pine gum | |
| Concentration, phr | 0 | 2.5 | 5 | 10 | 1 | 2.5 | 5 | 1 | 2.5 |
| Contact time: | | | | | | | | | |
| 30 seconds | 4 | 1 | 5 | 4 | 7 | 3 | 3 | 2 | 4 |
| 1 minute | 5 | 3 | 7 | 4 | 7 | 5 | 5 | 5 | 5 |
| 2 minutes | 6 | 7 | 11 | 6 | 9 | 8 | 7 | 6 | 6 |
| 3 minutes | 8 | 5 | 11 | 4 | 9 | 8 | 8 | 8 | 9 |
| 5 minutes | 8 | 5 | 17 | 7 | 17 | 7 | 9 | 5 | 15 |
| 15 minutes | 17 | 10 | 21 | 11 | 18 | 11 | 17 | 8 | 29 |
| 30 minutes | 16 | 21 | 39 | 12 | 23 | 17 | 14 | 36 | 24 |
| 60 minutes | 29 | 21 | 49 | 8 | 28 | 24 | 62 | 31 | 55 |

TABLE 2.—EFFECT OF TACKIFIER CONCENTRATION IN NITRILE RUBBER COMPOSITIONS (Recipe B)

| | | | | | | Tack strength, p.s.i. | | | | | |
|---|---|---|---|---|---|---|---|---|---|---|---|
| Tackifier | None | Maleic modified pine gum (Ex. 1) | | | | Fumaric modified pine gum (Ex. 2) | | | | Commercial pine gum | |
| Concentration, phr | 0 | 1 | 2.5 | 5 | 10 | 1 | 2.5 | 5 | 10 | 1 | 2.5 |
| Contact time: | | | | | | | | | | | |
| 30 seconds | 6 | 5 | 8 | 14 | 10 | 7 | 13 | 12 | 9 | 4 | 11 |
| 1 minute | 7 | 8 | 15 | 19 | 14 | 13 | 15 | 15 | 10 | 5 | 9 |
| 2 minutes | 10 | 10 | 16 | 17 | 14 | 10 | 20 | 16 | 15 | 7 | 5 |
| 3 minutes | 12 | 10 | 16 | 17 | 13 | 9 | 21 | 15 | 20 | 7 | 7 |
| 5 minutes | 14 | 14 | 21 | 22 | 22 | 29 | 24 | 27 | 23 | 9 | 9 |
| 15 minutes | 21 | 25 | 30 | 23 | 29 | 41 | 38 | 26 | 25 | 15 | 11 |
| 30 minutes | 20 | 32 | 37 | 31 | 35 | 52 | 37 | 37 | 28 | 18 | 32 |
| 60 minutes | 22 | 59 | 60 | 50 | 47 | 85 | 53 | 68 | 38 | 36 | 60 |

TABLE 3.—EFFECT OF TACKIFIER CONCENTRATION IN EPDM COMPOSITIONS (Recipe C)

| | | | | | Tack strength, p.s.i. | | | | |
|---|---|---|---|---|---|---|---|---|---|
| Tackifier | None | Maleic Modified pine gum | | | Fumaric modified pine gum | | | Commercial pine gum | |
| Concentration, phr | 0 | 1 | 2.5 | 5 | 1 | 2.5 | 5 | 1 | 2.5 |
| Contract time: | | | | | | | | | |
| 30 seconds | 23 | 23 | 25 | 33 | 20 | 28 | 35 | 15 | 8 |
| 1 minute | 30 | 23 | 28 | 38 | 25 | 28 | 43 | 20 | 15 |
| 2 minutes | 36 | 29 | 30 | 43 | 20 | 37 | 44 | 23 | 17 |
| 3 minutes | 43 | 34 | 35 | 47 | 26 | 45 | 46 | 26 | 19 |
| 5 minutes | 50 | 37 | 40 | 54 | 33 | 48 | 56 | 29 | 19 |
| 15 minutes | 66 | 69 | 65 | 51 | 72 | 68 | 63 | 47 | 34 |
| 30 minutes | 76 | 78 | 76 | 68 | 76 | 69 | 64 | 51 | 40 |
| 60 minutes | 76 | 83 | 79 | 70 | 83 | 87 | 66 | 71 | 63 |

From the data of the compositions in the preceding Tables 1, 2, and 3, it can be noted for nitrile synthetic rubber compositions that the highest employed concentrations of the modified pine gums are most effective as tackifiers at short contact times, while the lowest employed concentrations are about equally effective at the short contact times and/or even more effective at the long contact times. In the ethylene-propylene terpolymer synthetic rubber composition, the highest employed concentrations of the modified pine gums are most effective at the shortest contact times, while the lowest concentrations are more effective at the long contact times. In the styrene-butadiene synthetic rubber compositions, the Example II each composition, with sometimes greater or lesser enhancement noted as one or both of the synthetic rubber or particular modified pine gum are varied. However, within the useful range of ½ to 15 phr. of modified pine gum in the synthetic rubber composition there is preparable at least one composition of SBR, nitrile, and EPDM synthetic rubber which invariably exhibits enhanced building tack.

To illustrate that the modified pine gum tackifiers employed in the invention continue to be useful and have no significant detrimental effect on utility of synthetic rubber composition when curing agent and accelerators also are included in the composition's recipe, the following recipe is prepared and physical properties of the same compared with a control containing no tackifier therein and a control containing 5 phr. of a comparison tackifier.

RECIPE D

| Ingredients: | Parts by weight |
|---|---|
| SBR—1006 | 100 |
| EPC carbon black | 40 |
| Zinc oxide | 5 |
| Sulfur | 2 |
| Benzothiazl disulfide | 1.75 |
| Tackifier (as specified) | 5 |

The following Table 4 presents results of physical properties determined on these compositions, whose compounding is done on a 6 x 12-inch laboratory rubber mill, following closely ASTM milling procedures.

7. The composition of claim 1 in which the modified pin gum contained therein is said reaction product after removal of unreacted terpenes therefrom.

8. The composition of claim 1 wherein the modified pine gum is the reaction product in an inert atmosphere of 1000 parts by weight of a pine gum of 25 to 45 percent by weight turpentine content with from 250 to 450 parts by weight of maleic acid at from 190° to 250° C., for from 3-5 hours.

9. The composition of claim 1 wherein the modified pine gum is the reaction product in an inert atmosphere of 1000 parts by weight of a pine gum of 25 to 45 percent by weight turpentine content with from 250 to 450 parts by weight of fumaric acid at from 190° to 250° C., for from 305 hours.

TABLE 4.—EFFECT OF TACKIFIER ON PROPERTIES OF AN SBR VULCANIZATE

| Tackifier | None | Commercial pine gum | Fumaric modified pine gum (Ex. 2) | Fumaric modified pine gum (Ex. 3) |
|---|---|---|---|---|
| Mooney scorch and cure data at 250 F.: | | | | |
| Minimum viscosity | 44 | 36 | 45 | 46 |
| Δ5, minutes | 49.0 | 59.5 | 68 | 76.5 |
| Δ35, minutes | 70.0 | 165 | 104 | 106.5 |
| Δ35-Δ5, minutes | 21.0 | 106.5 | 36 | 30 |
| Mooney scorch and cure data at 302 F.[a]: | | | | |
| Minimum viscosity | 46 | 34 | 43 | 40 |
| Δ5, minutes | 7.4 | 7.7 | 10.3 | 9.5 |
| Δ35, minutes | 10.3 | 13.8 | 14.1 | 14.4 |
| Δ35-Δ5, minutes | 2.9 | 6.1 | 3.8 | 4.9 |
| Garvey die extrusion data [e]: | | | | |
| Garvey number | 12 | 12 | 12 | 12 |
| Weight extruded per 30 sec., gm | 64.6 | 72 | 96.2 | 72.5 |
| Length extruded per 30 sec., in | 18.0 | 20.6 | 21.1 | 21.3 |

| Cure, minutes at 302 F.: | 15 | 30 | 60 | 15 | 30 | 60 | 15 | 30 | 60 | 15 | 30 | 60 |
|---|---|---|---|---|---|---|---|---|---|---|---|---|
| 100% modulus, p.s.i.[b] | 190 | 280 | 380 | 120 | 130 | 210 | 190 | 220 | 300 | 140 | 200 | 230 |
| 300% modulus, p.s.i.[b] | 830 | 1,240 | 1,810 | 310 | 480 | 900 | 610 | 830 | 1,290 | 420 | 690 | 1,080 |
| Tensile strength, p.s.i.[b] | 1,870 | 2,520 | 2,810 | 610 | 1,230 | 2,910 | 1,470 | 1,940 | 2,680 | 1,050 | 1,840 | 3,070 |
| Elongation, percent [b] | 550 | 520 | 410 | 600 | 660 | 660 | 610 | 570 | 510 | 650 | 670 | 610 |
| Hardness, Shore A-2 [c] | 58 | 62 | 64 | 53 | 55 | 60 | 62 | 64 | 68 | 59 | 61 | 66 |
| Compression set, 22 hours, percent [d]: | | | | | | | | | | | | |
| 158 F | | 8 | | | 11 | | | 10 | | | 8 | |
| 212 F | | 16 | | | 18 | | | 19 | | | 18 | |

[a] ASTM Procedure D-1646.
[b] ASTM Procedure D-412, with die C used and specimens stretched at a rate of 20 in./min.
[c] ASTM Procedure D-2240, using a Shore A-2 durometer.
[d] ASTM Procedure D-395.
[e] ASTM Procedure D-2230, using a Garvey die and rating the extrusions according to Method A.

We claim:

1. A styrene-butadiene rubber, nitrile rubber or ethylene-propylene terpolymer rubber composition exhibiting enhanced building tack containing for each 100 parts by weight of the rubber content thereof, from ½ to 15 parts by weight of a modified pine gum which is the reaction product in an inert atmosphere of 1000 parts by weight of a pine gum of 25 percent by weight turpentine content with from 250 to 450 parts by weight of maleic acid, fumaric acid or maleic anhydride at from 190° to 250° C., for from 3-5 hours.

2. The composition of claim 1 wherein the pine gum reactant is a natural pine oleoresin.

3. The composition of claim 1 wherein the pine gum reactant is a blend of gum rosin and gum turpentine.

4. The composition of claim 1 wherein the pine gum reactant is a blend of tall oil rosin and alpha-pinene.

5. The composition of claim 1 wherein the pine gum reactant is a blend of wood rosin and sulfate turpentine.

6. The composition of claim 1 which contains between 2 and 11 parts of said reaction product for each 100 parts by weight of the rubber content thereof and wherein the pine gum reactant is a longleaf or slash pine oleoresin.

References Cited

UNITED STATES PATENTS

| 3,106,550 | 10/1963 | Bitting et al. | 260—101 |
| 3,288,737 | 11/1966 | Arakawa et al. | 260—27 |
| 3,438,918 | 4/1969 | Arlt et al. | 260—22 |

OTHER REFERENCES

Halbrook et al., "Fumaric Modified Rosin," industrial and engineering chemistry, volume 50, pp. 321 and 322, March 1958.

Compounding Ingredients for Rubber, third edition, 1961, Cuneo Press of New England, Cambridge, Mass., p. 217.

Wilson, British Compounding Ingredients for Rubber, W. Heffer & Sons, Ltd., Cambridge, England, 1958, pp. 308 and 309.

DONALD E. CZAJA, Primary Examiner

R. W. GRIFFIN, Assistant Examiner

U.S. Cl. X.R.

260—23 H, 23.7 N, 23.7 B, 23.7 M, 41 C, 41.5 R